(12) United States Patent
Peitz

(10) Patent No.: US 11,255,741 B1
(45) Date of Patent: Feb. 22, 2022

(54) ADJUSTABLE TIRE INFLATION ASSEMBLY

(71) Applicant: Nicholas Peitz, Garden Ciry, KS (US)

(72) Inventor: Nicholas Peitz, Garden Ciry, KS (US)

(*) Notice: Subject to any disclaimer, the term of this patent is extended or adjusted under 35 U.S.C. 154(b) by 0 days.

(21) Appl. No.: 17/108,146

(22) Filed: Dec. 1, 2020

(51) Int. Cl.
*G01L 19/12* (2006.01)
*B60S 5/04* (2006.01)

(52) U.S. Cl.
CPC .................. *G01L 19/12* (2013.01); *B60S 5/04* (2013.01)

(58) Field of Classification Search
CPC ........................................ G01L 19/12
USPC ........................................ 137/227
See application file for complete search history.

(56) References Cited

U.S. PATENT DOCUMENTS

| 4,333,491 | A | * | 6/1982 | Knubley | ................. | B60S 5/046 |
| | | | | | | 137/116.3 |
| 4,763,709 | A | | 8/1988 | Scholer | | |
| 4,776,766 | A | * | 10/1988 | Brent | ...................... | F04B 33/00 |
| | | | | | | 137/224 |
| 5,307,846 | A | | 5/1994 | Heinemann | | |
| 6,892,776 | B2 | | 5/2005 | Skoff | | |
| 6,966,220 | B2 | | 11/2005 | Yuch | | |
| 7,040,153 | B2 | | 5/2006 | Kroll | | |
| 8,191,586 | B2 | * | 6/2012 | Huval | ..................... | B60S 5/046 |
| | | | | | | 141/38 |
| D670,313 | S | | 11/2012 | Ohm | | |
| 8,418,713 | B2 | | 4/2013 | Huang | | |
| 9,248,707 | B2 | | 2/2016 | Zhou | | |
| 10,618,450 | B2 | * | 4/2020 | Beard | ..................... | B60P 7/065 |
| 10,657,757 | B2 | * | 5/2020 | Burrows | ............... | G07F 15/001 |

FOREIGN PATENT DOCUMENTS

WO WO2019014640 1/2019

* cited by examiner

*Primary Examiner* — Albert K Wong

(57) ABSTRACT

An adjustable tire inflation assembly for precisely inflating a tire to a desired pressure includes a tire inflation fitting that is fluidly attachable to a valve stem on a tire for inflating the tire. A pressure adjustment unit is integrated into the tire inflation fitting that is settable between a minimum pressure and a maximum pressure. The pressure adjustment unit senses the pressure within the tire when the tire is being inflated with the tire inflation fitting. A light emitter is coupled to the tire inflation fitting and the light emitter is turned on when the pressure adjustment unit senses air pressure within the tire inflation unit that matches the pressure to which the pressure adjustment unit is set. In this way the light emitter alerts the user that the tire has been inflated to the desired pressure.

10 Claims, 3 Drawing Sheets

ADJUSTABLE TIRE INFLATION ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to inflation device and more particularly pertains to a new inflation device for precisely inflating a tire to a pre-determined pressure.

(2) Description of Related Art Including Information Disclosed Under 37 CFR 1.97 and 1.98

The prior art relates to inflation devices including a variety of tire inflation devices that are integrated into a vehicle for inflating each of the vehicle's tires to a specified pressure. The prior art discloses a portable tire inflation device that includes an electronic display and a pressure relief valve that discharges air when a tire being inflated has reached a predetermined pressure. In no instance does the prior art disclose a portable tire inflation device that includes a pressure adjustment dial and an electronic indicator for indicating when a tire is inflated to a pre-determined pressure.

BRIEF SUMMARY OF THE INVENTION

An embodiment of the disclosure meets the needs presented above by generally comprising a tire inflation fitting that is fluidly attachable to a valve stem on a tire for inflating the tire. A pressure adjustment unit is integrated into the tire inflation fitting that is settable between a minimum pressure and a maximum pressure. The pressure adjustment unit senses the pressure within the tire when the tire is being inflated with the tire inflation fitting. A light emitter is coupled to the tire inflation fitting and the light emitter is turned on when the pressure adjustment unit senses air pressure within the tire inflation unit that matches the pressure to which the pressure adjustment unit is set. In this way the light emitter alerts the user that the tire has been inflated to the desired pressure.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
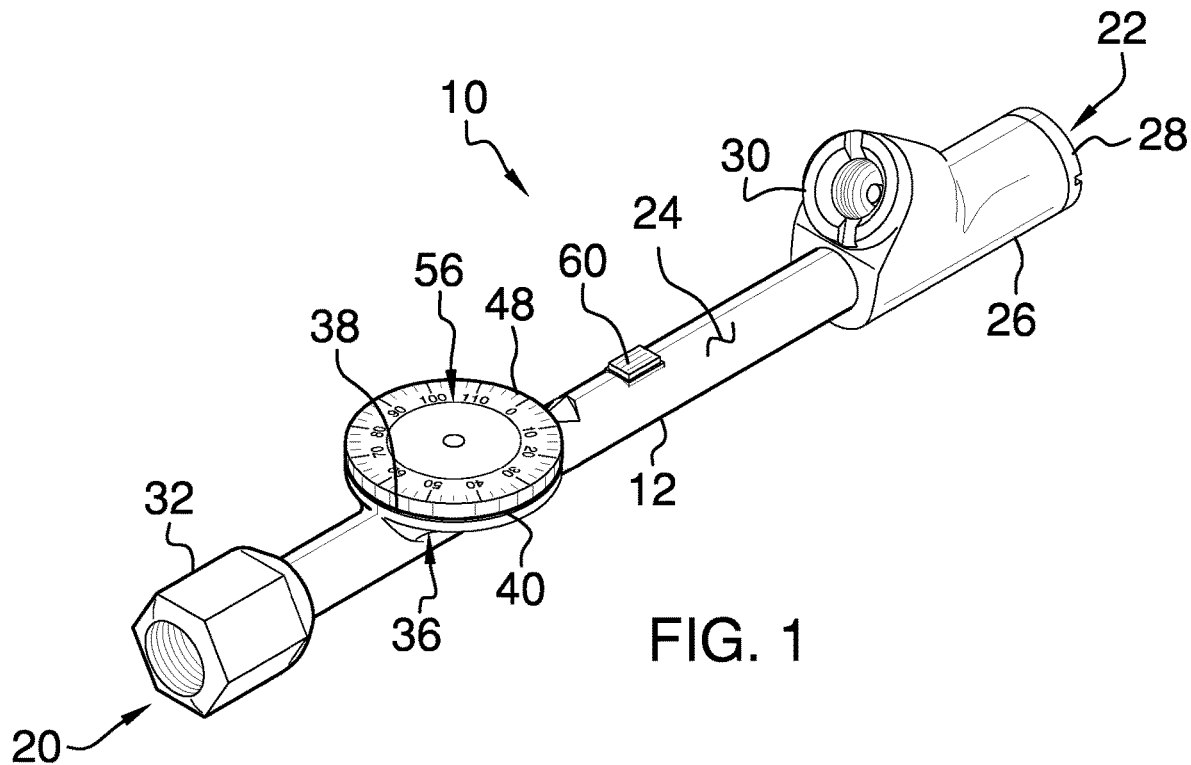
FIG. 1 is a top perspective view of an adjustable tire inflation assembly according to an embodiment of the disclosure.
Figure 2:
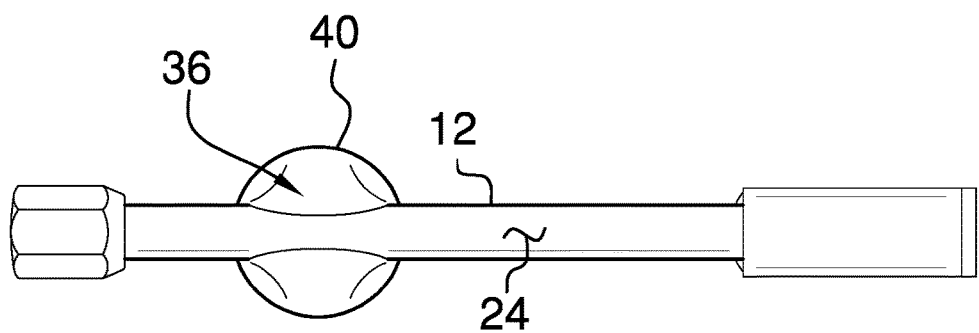
FIG. 2 is a bottom phantom view of an embodiment of the disclosure.
Figure 3:
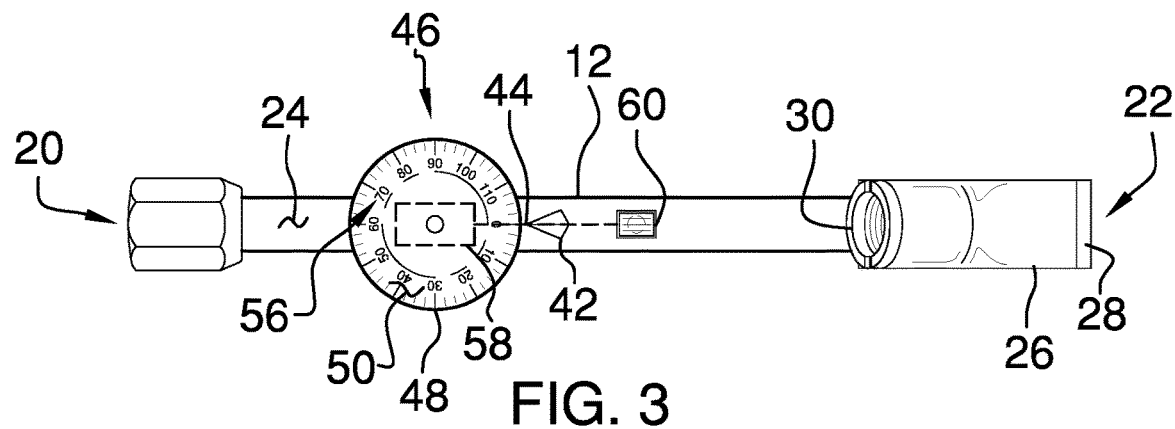
FIG. 3 is a top phantom view of an embodiment of the disclosure.
Figure 4:
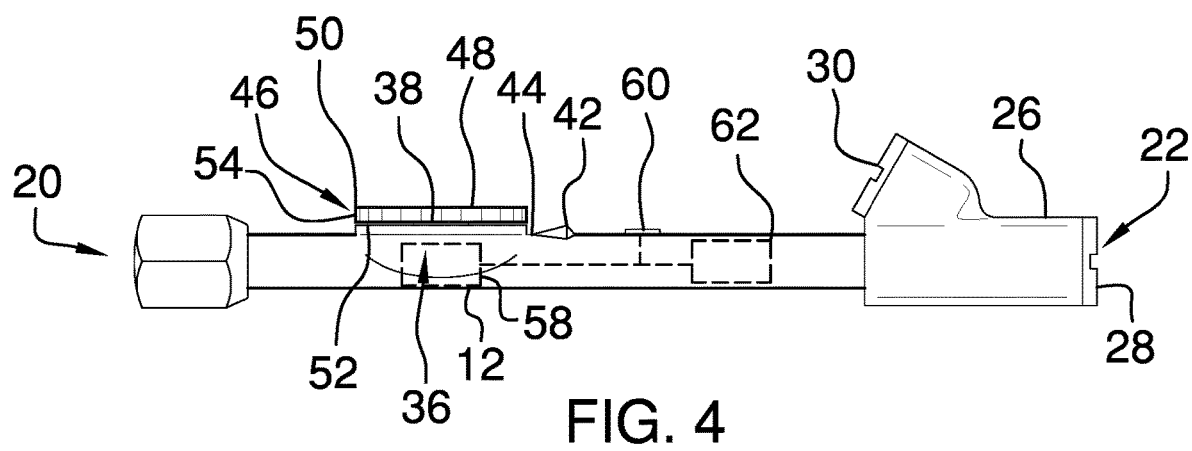
FIG. 4 is a right side phantom view of an embodiment of the disclosure.
Figure 5:
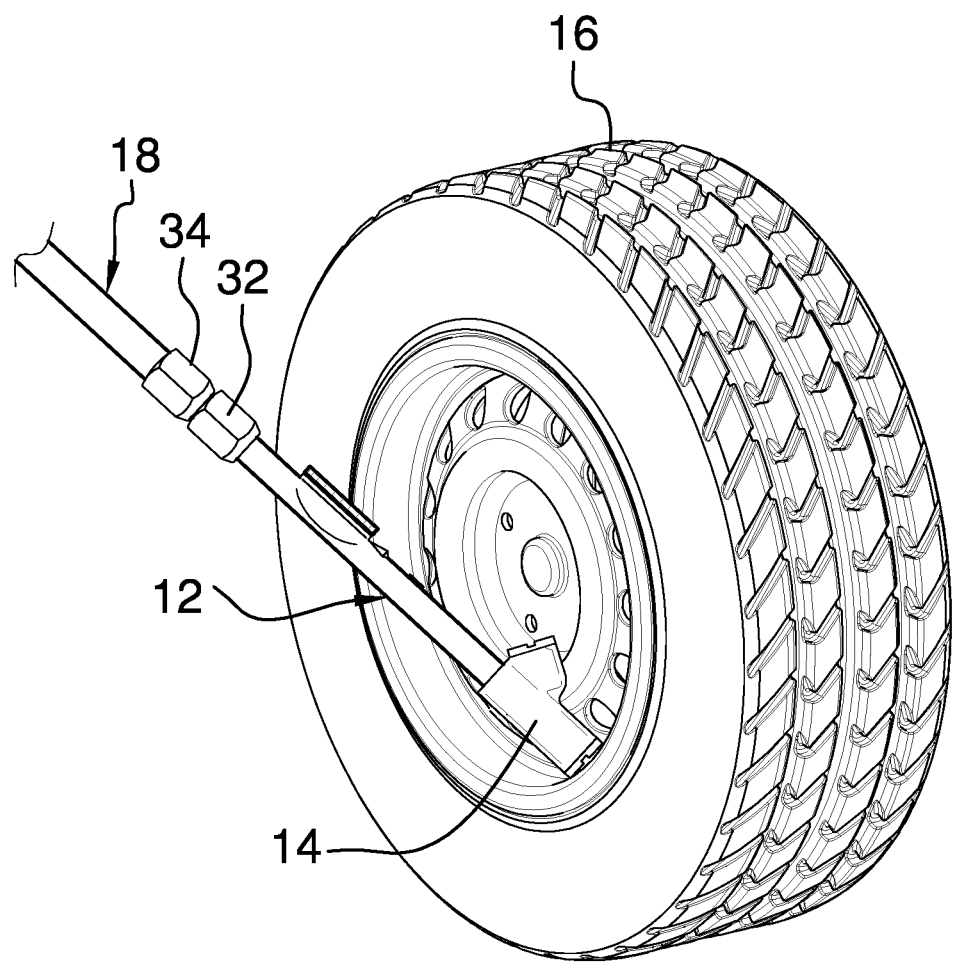
FIG. 5 is a perspective in-use view of an embodiment of the disclosure.

With reference now to the drawings, and in particular to FIGS. 1 through 5 thereof, a new inflation device embodying the principles and concepts of an embodiment of the disclosure and generally designated by the reference numeral 10 will be described.

As best illustrated in FIGS. 1 through 5, the adjustable tire inflation assembly 10 generally comprises a tire inflation fitting 12 that is fluidly attachable to a valve stem 14 on a tire 16. In this way the tire inflation fitting 12 can be fluidly coupled to a compressed air source 18 for inflating the tire 16. The tire 16 may be an inflatable tire of any conventional design, such as would commonly be found on motorized vehicles that are driven on public roadways or the like.

The tire inflation fitting 12 has a first end 20, a second end 22 and an outer surface 24 extending therebetween. The second end 22 has an inflation valve 26 that is fluidly integrated therein and the inflation valve 26 has a first outlet 28 and a second outlet 30. The first outlet 28 has a direction of flow that is oriented in-line with an axis extending through the first end 20 and the second end 22. The second outlet 30 has a direction of flow that is oriented at an acute angle with the axis. Either of the first outlet 28 or the second outlet 30 is fluidly attachable to the valve stem 14 to accommodate a variety of valve stem 14 orientations. Each of the first outlet 28 and the second outlet 30 may comprise a tire inflation valve of any conventional design.

The first end 20 has a female air fitting 32 integrated therein and the female air fitting 32 can be fluidly coupled to a male air fitting 34 that is attached to the compressed air source 18. The outer surface 24 has a flared portion 36 and the flared portion 36 has a top surface 38 and a perimeter edge 40. The top surface 38 is planar and the perimeter edge 40 is continuously arcuate about a center point of the top surface 38 such that the top surface 38 defines a circle. The flared portion 36 is positioned closer to the second end 22 than the first end 20. Additionally, the outer surface 24 has an indicator 42 integrated therein and the indicator 42 has a pointed end 44 that is directed toward the flared portion 36.

A pressure adjustment unit 46 is integrated into the tire inflation fitting 12 that can be manipulated by a user. The pressure adjustment unit 46 is settable between a minimum pressure and a maximum pressure to facilitate the user to decide the pressure to which the tire 16 should be inflated. The pressure adjustment unit 46 is in fluid communication with an interior of the tire inflation fitting 12 to sense the pressure within the tire 16 when the tire 16 is being inflated with the tire inflation fitting 12. The pressure adjustment unit 46 comprises an adjustment dial 48 that is rotatably integrated onto the tire inflation fitting 12. The adjustment dial 48 is rotatable between a minimum pressure and a maximum pressure.

The adjustment dial 48 has an upper surface 50, a lower surface 52 and an outer edge 54 extending therebetween. The lower surface 52 is spaced from the top surface 38 of the flared portion 36 of the outer surface 24 of the inflation valve 26. The upper surface 50 has indicia 56 printed thereon and the indicia 56 are distributed around the outer edge 54. The indicia 56 comprise numbers ranging between a minimum pressure and a maximum pressure to define a pressure scale. The adjustment dial 48 is rotatable such that pointed end 44 of the indicator 42 on the outer surface 24 of the tire inflation fitting 12 is aligned with a respective number on the upper surface 50.

The pressure adjustment unit 46 includes a pressure sensor 58 is integrated into the tire inflation fitting 12 to sense air pressure within the tire inflation fitting 12 and the pressure sensor 58 is in communication with the adjustment dial 48. The pressure sensor 58 emits an alert signal when the pressure sensor 58 senses air pressure that matches the pressure at which the adjustment dial 48 is set. The pressure sensor 58 may comprise an electronic air pressure sensor with an operational sensitivity ranging between approximately 0.0 psi and 150.0 psi.

A light emitter 60 is coupled to the tire inflation fitting 12 to emit light outwardly therefrom and the light emitter 60 is in communication with the pressure adjustment unit 46. The light emitter 60 is turned on when the pressure adjustment unit 46 senses air pressure within the tire 16 inflation unit that matches the pressure to which the pressure adjustment unit 46 is set. In this way the light emitter 60 can alert the user that the tire 16 has been inflated to the desired pressure. The light emitter 60 is electrically coupled to the pressure sensor 58 and the light emitter 60 is turned on when the pressure sensor 58 emits the alert signal. The light emitter 60 is positioned on the outer surface 24 of the tire inflation fitting 12 such that the light emitter 60 is visible to the user. The light emitter 60 may comprise an LED or type of electronic light emitter. A power supply 62 is integrated into the tire inflation fitting 12, the power supply 62 is electrically coupled to the pressure sensor 58 and the power supply 62 comprises at least one battery.

In use, the female air fitting 32 is coupled to an air hose from a compressor, or the like, and the adjustment dial 48 is set to the pressure to which the tire 16 is to be inflated. The inflation valve 26 is coupled to the valve stem 14 on the tire 16 to facilitate the tire 16 to be inflated. The light emitter 60 is turned on when the pressure sensor 58 senses air pressure that matches the pressure to which the adjustment dial 48 has been set. In this way the light emitter 60 notifies the user to remove the inflation valve 26 from the valve stem 14 to cease inflating the tire 16. Thus, the tire 16 can be accurately inflated to any desired pressure without over-inflating or under-inflating the tire 16.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. An adjustable tire inflation assembly for inflating a tire to a predetermined pressure and indicating when the predetermined pressure has been achieved, said assembly comprising:
   a tire inflation fitting being fluidly attachable to a valve stem on a tire wherein said tire inflation fitting is configured to be fluidly coupled to a compressed air source for inflating the tire;
   a pressure adjustment unit being integrated into said tire inflation fitting wherein said pressure adjustment unit is configured to be manipulated by a user, said pressure adjustment unit being settable between a minimum pressure and a maximum pressure wherein said pressure adjustment unit is configured to facilitate the user to decide the pressure to which the tire should be inflated, said pressure adjustment unit being in fluid communication with an interior of said tire inflation fitting wherein said pressure adjustment unit is configured to sense the pressure within the tire when the tire is being inflated with said tire inflation fitting and control the compressed air source;
   a light emitter mounted to said tire inflation fitting wherein said light emitter is configured to emit light outwardly therefrom, said light emitter being in communication with said pressure adjustment unit, said light emitter being turned on when said pressure adjustment unit senses air pressure within said tire inflation unit that matches the pressure to which said pressure adjustment unit is set wherein said light emitter is configured to alert the user that the tire has been inflated to the desired pressure.

2. The assembly according to claim 1, wherein:
   said tire inflation fitting has a first end, a second end and an outer surface extending therebetween, said second end having an inflation valve being fluidly integrated therein;

said inflation valve having a first outlet and a second outlet, said first outlet having a direction of flow being oriented in-line with an axis extending through said first end and said second end, said second outlet having a direction of flow being oriented at an acute angle with said axis, either of said first outlet or said second outlet being fluidly attachable to the valve stem wherein said inflation valve is configured to accommodate a variety of valve stem orientations; and said first end has a female air fitting being integrated therein wherein said female air fitting is configured to be fluidly coupled to a male air fitting being supplied by the compressed air source.

3. The assembly according to claim 2, wherein said outer surface has a flared portion, said flared portion having a top surface and a perimeter edge, said top surface being planar, said perimeter edge being continuously arcuate about a center point of said top surface such that said top surface defines a circle, said flared portion being positioned closer to said second end than said first end.

4. The assembly according to claim 3, wherein said outer surface has an indicator being integrated therein, said indicator having a pointed end being directed toward said flared portion.

5. The assembly according to claim 3, wherein said pressure adjustment unit comprises an adjustment dial being rotatably integrated onto said tire inflation fitting, said adjustment dial being rotatable between a minimum pressure and a maximum pressure, said adjustment dial having an upper surface, a lower surface and an outer edge extending therebetween, said lower surface being spaced from said top surface of said flared portion of said outer surface of said inflation valve.

6. The assembly according to claim 5, wherein said upper surface has indicia being printed thereon, said indicia being distributed around said outer edge, said indicia comprising numbers ranging between a minimum pressure and a maximum pressure to define a pressure scale, said adjustment dial being rotatable such that said pointed end of said indicator on said outer surface of said tire inflation fitting is aligned with a respective number on said upper surface.

7. The assembly according to claim 5, wherein said pressure adjustment unit includes a pressure sensor being integrated into said tire inflation fitting wherein said pressure sensor is configured to sense air pressure within said tire inflation fitting, said pressure sensor being in communication with said adjustment dial, said pressure sensor emitting an alert signal when said pressure sensor senses air pressure that matches the pressure at which said adjustment dial is set.

8. The assembly according to claim 7, wherein said light emitter is electrically coupled to said pressure sensor, said light emitter being turned on when said pressure sensor emits said alert signal, said light emitter being positioned on said outer surface of said tire inflation fitting wherein said light emitter is configured to be visible to the user.

9. The assembly according to claim 7, further comprising a power supply being integrated into said tire inflation fitting, said power supply being electrically coupled to said pressure sensor, said power supply comprising at least one battery.

10. An adjustable tire inflation assembly for inflating a tire to a predetermined pressure and indicating when the predetermined pressure has been achieved, said assembly comprising:

a tire inflation fitting being fluidly attachable to a valve stem on a tire wherein said tire inflation fitting is configured to be fluidly coupled to a compressed air source for inflating the tire, said tire inflation fitting having a first end, a second end and an outer surface extending therebetween, said second end having an inflation valve being fluidly integrated therein, said inflation valve having a first outlet and a second outlet, said first outlet having a direction of flow being oriented in-line with an axis extending through said first end and said second end, said second outlet having a direction of flow being oriented at an acute angle with said axis, either of said first outlet or said second outlet being fluidly attachable to the valve stem wherein said inflation valve is configured to accommodate a variety of valve stem orientations, said first end having a female air fitting being integrated therein wherein said female air fitting is configured to be fluidly coupled to a male air fitting being supplied by the compressed air source, said outer surface having a flared portion, said flared portion having a top surface and a perimeter edge, said top surface being planar, said perimeter edge being continuously arcuate about a center point of said top surface such that said top surface defines a circle, said flared portion being positioned closer to said second end than said first end, said outer surface having an indicator being integrated therein, said indicator having a pointed end being directed toward said flared portion;

a pressure adjustment unit being integrated into said tire inflation fitting wherein said pressure adjustment unit is configured to be manipulated by a user, said pressure adjustment unit being settable between a minimum pressure and a maximum pressure wherein said pressure adjustment unit is configured to facilitate the user to decide the pressure to which the tire should be inflated, said pressure adjustment unit being in fluid communication with an interior of said tire inflation fitting wherein said pressure adjustment unit is configured to sense the pressure within the tire when the tire is being inflated with said tire inflation fitting and control the compressed air source, said pressure adjustment unit comprising:

an adjustment dial being rotatably integrated onto said tire inflation fitting, said adjustment dial being rotatable between a minimum pressure and a maximum pressure, said adjustment dial having an upper surface, a lower surface and an outer edge extending therebetween, said lower surface being spaced from said top surface of said flared portion of said outer surface of said inflation valve, said upper surface having indicia being printed thereon, said indicia being distributed around said outer edge, said indicia comprising numbers ranging between a minimum pressure and a maximum pressure to define a pressure scale, said adjustment dial being rotatable such that pointed end of said indicator on said outer surface of said tire inflation fitting is aligned with a respective number on said upper surface; and a pressure sensor being integrated into said tire inflation fitting wherein said pressure sensor is configured to sense air pressure within said tire inflation fitting, said pressure sensor being in communication with said adjustment dial, said pressure sensor emitting an alert signal when said pressure sensor senses air pressure that matches the pressure at which said adjustment dial is set;

a light emitter mounted to said tire inflation fitting wherein said light emitter is configured to emit light outwardly therefrom, said light emitter being in communication with said pressure adjustment unit, said light emitter being turned on when said pressure adjustment unit senses air pressure within said tire inflation unit that matches the pressure to which said pressure adjustment unit is set wherein said light emitter is configured to alert the user that the tire has been inflated to the desired pressure, said light emitter being electrically coupled to said pressure sensor, said light emitter being turned on when said pressure sensor emits said alert signal, said light emitter being positioned on said outer surface of said tire inflation fitting wherein said light emitter is configured to be visible to the user; and a power supply being integrated into said tire inflation fitting, said power supply being electrically coupled to said pressure sensor, said power supply comprising at least one battery.

\* \* \* \* \*